Aug. 6, 1968 R. KALICH 3,395,897
METHOD OF AND APPARATUS FOR MIXING HYDRAULICALLY HARDENABLE
BINDING MATERIAL AND WATER
Filed March 9, 1966 4 Sheets-Sheet 1

INVENTOR.
Rudolf Kalich
BY

United States Patent Office 3,395,897
Patented Aug. 6, 1968

3,395,897
METHOD OF AND APPARATUS FOR MIXING HYDRAULICALLY HARDENABLE BINDING MATERIAL AND WATER
Rudolf Kalich, 1 Carl Benz Str., 7504 Weingarten, Germany
Filed Mar. 9, 1966, Ser. No. 532,948
Claims priority, application Germany, Mar. 11, 1965, K 55,514, K 55,515; Sept. 27, 1965, K 57,236
12 Claims. (Cl. 259—148)

The present invention relates to the making of cement-water paste and, more specifically, concerns a method of and apparatus for the making of mixtures of cementing material such as cement-water paste from cement and water to which, if desired, already may be added pulverous, fine granular, or liquid substances. The intermixing is effected in a mixer in which an agitator operable from the outside is arranged and into which there is introduced cementing or binding material withdrawn from a storage container. Feeding conduits for water and compressed air lead into the mixer while the cementing or binding material-water mixture is conveyed from the mixing container by means of compressed air through a closable discharge, and a connecting line feeds to the main mixing drum at the bottom of which an agitator operable at variable speed is effective.

In connection with the making of concrete, it is known that in addition to the quality of the cement, the composition of the cement-water paste i.e. the water-cement value, and the degree of suspension of the cement in the water are of foremost importance for the obtainable pressure resistance of the cement stone which in the settled and hardened concrete interconnects the stones of the core framework. Advantageously, the cement-water paste is premixed in a separate mixer, and is then introduced into the concrete mixing machine which intermixes the admixtures and the cement-water paste. The method according to the present invention is particularly directed to the premixing operation, i.e. the mixing of water with cement and, if desired, with pulverous, fine granular, or liquid additives or aggregates.

A satisfactory cement-water paste is formed when each cement particle is completely surrounded by water so that a colloidal suspension is obtained. Only under these circumstances a proper satisfactory formation of crystals is possible by hydration which crystallization permits the cement-water paste to harden to cement stone of considerable strength and density. This complete wetting normally encounters various difficulties, namely:

(1) The surface tension of the water,
(2) The uni-polar electric charges of the elements to be intermixed,
(3) The tendency to form nests.

The last mentioned tendency to form nests, due to the fact that the cement contacting the water will, due to its surface, form a jell-like mass (hydration) which in the manner of a skin may encase a plurality of cement particles and thus prevents the latter from being wetted. During the jell formation, the cement binds approximately 25% of its weight to water so that the complete wetting or humidification of such a cement nest can occur only when during the further course of the stonification, water is continuously added. Since this, however, for reasons of cost, is rarely possible over a sufficiently long period of time, the cement encased in such a nest will not take part in the jell formation nor will it take part in the stonification of the cement-water paste which is of considerable influence on the strength of the concrete. If, on the other hand, sufficient water is available over a sufficiently long period of time, the jell layer will increase until all of the cement particles have been completely hydrated. If the said nest formation can be prevented, each cement particle will from the very start absorb the quantity of water required for its hydration, and the jell formation will take place in an ideal way. A later humidification or wetting of the finished cement stone or concrete can then be limited to the surface in order to prevent the latter from drying out.

With one of the heretofore known methods involved, at least the first two difficulties can be overcome by adding the mixing water to the cement only gradually and feeding it from a container through the intervention of a pump to the mixer from where the thus obtained substance is fed into a receiving container. In this way, a water-cement circulation with slowly increasing viscosity is obtained which circulation, however, for purposes of preparing a cement-water paste with low water-cement value requires a time which is too long for the customary processing in the concrete mixing machine.

A short mixing time is important for various reasons, and especially because immediately after the wetting of the cement with water, hydration and thus cement stone formation starts independently of further outer influences. Thus, it is not possible to premix a larger quantity of cement-water paste and then only from time to time to withdraw the thus obtained mixture for the making of concrete. The situation is rather such that each time only such a quantity can be prepared which will immediately after its preparation be used in the concrete mixer which follows the premixer. If the mixing of the cement-water paste takes too much time, the hydration of the cement may have advanced too far so that the bringing in of the concrete, especially at low water-cement values, encounters considerable difficulties. Moreover, long mixing periods make concrete mixing installations uneconomical because they can operate only as fast as the slowest link in the processing chain. The operating cycle of a modern conventional concrete mixing machine which mixes water, cement and aggregates, comprises approximately 60 seconds. An operating cycle going beyond this time period for the intermixing operation, i.e. for the making of cement-water paste is, therefore, for reasons of cost and economy unacceptable.

It is, therefore, an object of the present invention to provide a method and apparatus for making a cement-water paste, which will overcome the above mentioned drawbacks.

It is also an object of this invention to provide a method of and apparatus for mixing cement and, if desired, additives and aggregates with water in such a way that the properties of the individual mixing components which act against a proper intermixture of the substances referred to will be eliminated or overcome.

It is also an object of this invention to provide a method of and apparatus for the making of cement-water paste which will permit preparing the mixture, i.e., the cement-water paste, in a time period which will not exceed the working cycle of the concrete mixing machine.

These and other objects and advantages of the invention will appear more clearly from the following specification in connection with the accompanying drawings, in which:

FIG. 2a is a plan sectional view of the mixing container and shows the concave guiding plates, the inner edges of which are directed to the center of the mixing container.

FIG. 2b is a view like FIG. 2a but shows the concave flow guiding plates with the inner edges thereof directed counter to the flow of the mixed material.

Figure 1:
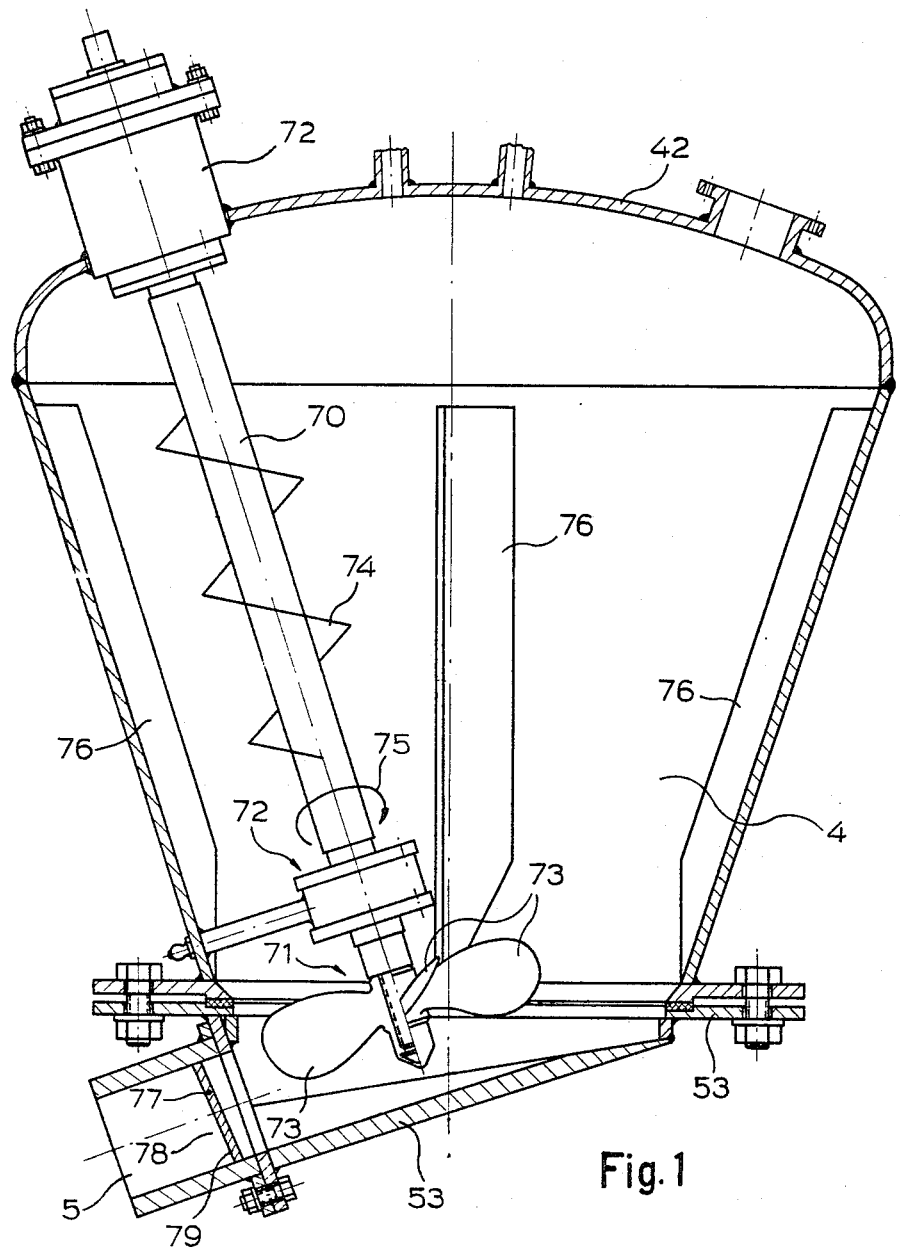
FIG. 1 shows a mixing apparatus with drive from the top and fixedly arranged sheet metal guiding plates.

The problem underlying the present invention, namely to provide a method of making cement-water paste from cement and water, if desired, while adding pulverous, fine granular, or liquid additives and/or aggregates, has been solved according to the present invention by effecting the mixing operation in conformity with the following steps:

(a) Introducing the mixing water into the mixing container, (b) Agitating the mixing water so that no cavitation will occur, (c) Adding the cement and, if desired, the additives and/or aggregates, (d) Agitating the mixture beyond the limitation for the cavitation of water.

The mixing water introduced into the mixing container in conformity with the method step (a) supra is by agitation (produced by rotating members) in conformity with method step (b) so rotated without the occurrence of cavitation that a flow is formed which will catch the cement added in conformity with method step (c) supra. Inasmuch as the flow can develop fully since it is not impeded by cavitation, it is possible to introduce the total quantity of the cement to be added (in conformity with method step (c)) at once, if desired, with additives and/or aggregates. The cement will immediately be caught by the flow or current and will be driven through the mixing container. During this operation, the cement will forceably be conveyed by the agitating members so that a premixing operation will occur which is desired for reducing the mixing time proper. Immediately following the introduction of the cement into the mixing container, the relative speed of the agitating members is, in conformity with the present invention, increased beyond the speed for the cavitation borderline for water. The mixture prepared in conformity with the above outlined method steps (a), (b) and (c) is, due to the higher relative speed, broken up and digested in a minimum of time so that all cement particles will be wetted by the water. The thus produced colloidal cement-water paste can now be withdrawn from the mixing container and can be conveyed to a customary or standard concrete mixer for adding the aggregates. Inasmuch as the various method steps require only some seconds, and since also method step (a) can be combined with method step (b) in such a way that simultaneously with the introduction of the mixing water, the agitating parts are driven, or the agitating parts may rotate continuously, the total mixing time will be extremely short.

Advantageously, the speed of the agitating members during the method step (b) is so selected and/or the members moved relative to the water are in a manner known per se so designed that at the thus obtained speed the cavitation line is nearly touched but not yet exceeded, in other words, cavitation does not yet occur. The reference speed in this connection is the relative speed of the agitating means during the method step (b) which means are so to be designed that while a desired flow or current is formed, no cavitation will occur yet.

Higher speeds as they are necessary for a faster intermixture exceed the cavitation line for water and prevent an intensive intermixing due to the fact that above the rotating part there will form a steam bubble layer brought about by cavitation. Such layer, which not only prevents the formation of a flow moving the cement to the rotating parts but will also bring about an undesired cement stone formation at the borderline of the cavitation zone above the moved parts of the premixer.

The method according to the present invention can be employed with all heretofore known mixer types which permit the establishment of a flow for the method step (b) referred to above. Thus, rotary drum mixers as well as propeller mixers or other agitators may be employed as far as they permit the execution of the above mentioned four method steps (a) to (d). However, experience has shown that it is particularly advantageous to employ a propeller mixer the agitating blades of which are in conformity with the present invention so designed that at the lowest driving speed no cavitation will yet occur while the cavitation line is approximately approached.

This design of the agitator blades brings about that at the lowest speed at which no cavitation yet will occur as mentioned above, the water will be moved so that a flow is formed which when the cement is introduced into the mixing container will immediately convey the cement to the agitating blades and thereby bring about an intimate intermixture of the cement and the mixing water. During this intermixture, no nests can form because the agitating blades will mechanically destroy such nests and will turbulently intermix the cement with the mixing water. This beating up of the cement and whirling around of the cement in the mixing water will be aided by increasing the speed of the agitator after introducing the cement. In this way, a proper suspension will be formed in which each cement particle will be so surrounded by water that a proper hydration will take place without cement nests being formed or remaining in the mixture.

Advantageously, the agitator extends from the top into the mixing container and in conformity with the present invention, the agitator has on the driving shaft therefor a large surface worm which during operation of the agitator feeds the mixture toward the agitating members. At the lowest speed of the agitator, the worm will aid the flow effect and will likewise feed the introduced cement to the propeller-shaped agitating blades. At increased speed, turbulence will occur which will catch the mixed material. The funnel-shaped tip of said turbulence or whirl ends above the propeller-shaped agitator blades while the worm arranged on the driving shaft is, outside the mixing material, located on the axis of said whirl. Thus, with increased speed, the worm will in spite of its large surface not bring about an increase in the driving power or output which may have a harmful effect on the degree of efficiency of such mixer. In order to avoid the provision of a miter gear which is liable to disturbances, the shaft which drives the agitator and extends beyond the mixer is connected to a driving motor which is arranged parallel to the shaft. Advantageously, the driving shaft is arranged at an inclined angle with regard to the central axis of the mixing container so that the said driving shaft protrudes from the upper portion of the mixing container near the marginal area thereof. When the mixing container is conformity with a further feature of the present invention has the shape of a truncated cone resting on its smaller surface, the driving shaft for the agitator extends for purposes of obtaining proper flow conditions approximately parallel to the wall of the container.

Due to the fact that a vertical circulation superimposes itself upon the rotary movement of the mixing material, it will be aprpeciated that with a mixing apparatus of the above mentioned type the individual particles of the mixing material continuously move along a path which extends from the propeller above the bottom, at an incline in the direction of the propeller, then up the inner wall, and in rotary direction of the propeller into the turbulence path of the agitator. After a certain time, depending on the viscosity of the mixing material, the mixing material will adopt the rotary speed of the agitator whereby the mixing effect of the latter will cease. In order to obviate this situation, heretofore known mixing apparatuses of the type involved have their inner wall provided with downwardly leading sheet metal guiding plates which may be plane or with regard to the direction of flow may be curved in a concave manner. The purpose of these sheet metal guiding plates consists in slowing down the rotary movement of the mixing material, and furthermore to produce such a flow that all particles of the mixing material will be caught thereby and will be driven through the agitator. The course of the flow through the sheet metal guides is necessary because the vertical circulation of the mixing material may, depending on the character of the mixing material, form in such a way that the material which is in the central portion of this vertical circulation cannot get into contact with the mixing blades. The sheet metal guiding plates thus are intended first, to maintain the relative movement between agitator and mixing material and, secondly, to guide the mixing material from the inner wall of the mixing container away to the center thereof.

Regardless how the sheet metal guiding plates have been designed, it will be appreciated that behind these plates turbulence will form in which the mixing material will be drawn in counter current to the main flow and, more specifically, will be drawn to that side of the plates which faces the agitator. This interferes in particular with mixing material of viscous consistency and short mixing periods because the material pulled behind the sheet metal plates will not take part in the brief mixing operation. When mixing hydraulically hardenable binding means with water, there exists the danger that the space behind said guiding plates will gradually "grow over" and thus will not only decrease the volume of the mixing container but will also interfere with the previously established flow conditions. This situation is due to the fact that the hydration of the hydraulically hardenable binding means starts already when said binding means will come into contact with water at which time the hydration cannot be stopped anymore.

In order to avoid these turbulences behind the flow guiding plates, they may be spaced from the inner wall of the mixing container. In this way, the mixing material will be washed around the guiding plates from two sides, and inasmuch as they are inclined with regard to the direction of flow, generally no turbulence or whirls and thus no return flows can form. Such an arrangement, however, has the drawback that the flow engaging the inner wall of the mixing container will not reach the center point of the container and will thus not be guided to the mixer plate. In other words, when mixing hydraulically handenable binding means with water, after a certain time a stone layer will deposit which not only decreases the volume of the mixing container but also interferes with the optimum flow conditions and clogs up the space between the inner wall and the flow guiding plates.

With mixing containers of the open type, for instance with the so-called cement mixers in which cement is mixed with water, fillers and aggregates in a substantially horizontal blade-equipped drum, while the drum has a unilaterally arranged opening, the residues can be removed after each mixing operation, but at the latest when they interfere with the mixing operation. With a mixing container of the type described, in which the mixing material is removed from the mixing container by compressed air, this is not possible because the mixing container is in a pressure-tight manner connected so that a cleaning after each mixing operation would be economically unfeasible. Applicant has found that the mixing water entering the mixing container may be so conveyed that adhering mixture residues can be floated away from structural elements arranged in the mixing container. Aside from the fact that such way of guiding the water is rather difficult, it is also to be considered that the washing after the mixing operation has been completed is usually omitted or it is effected too late after hydration of the binding means has already been effected. A washing operation after the binding means have hardened, is, however, useless. The removal of the deposited hardened binding means can at that time be carried out only by mechanical tools which requires the opening of the mixing container.

The problem underlying the present invention to provide a mixing container in which the deposit of mixing material behind the flow guiding plates or at the inner wall of the mixing container will be prevented, has been solved according to the present invention by so arranging the flow guiding plates that they preferably engage the inner wall of the mixing container and are mounted on a rotatable member movable about the axis of rotation of the mixing container.

Thus, in conformity with the present invention, the flow guiding plates are no longer rigidly connected to the inner wall of the container but are adapted to rotate about the axis of the mixing container. The rotary movement of the guiding plates may be effected in or counter to the direction of rotation of the agitator depending on the desired relative movement between mixing material and flow guiding plates. The advantageously reversible drive of said rotatable member or turnstile may act upon a hollow shaft surrounding the agitator shaft or may be mounted on the cover of the mixing container.

Thus, it is possible to rotate the flow guiding plates during the mixing operation in a direction which is different from the direction in which said plates rotate during the charging of the mixing water. As a result thereof, in spite of the relative movement between said guiding plates, the inner wall of the mixing container and the mixing material, any mixture residues, therefore, which might possibly have been deposited will be washed away by the mixing water when the direction of rotation of said plates has been reversed. The shape of said guiding plates is almost immaterial as far as this cleaning operation is concerned. For mixtures of varying consistency, however, it is advantageous so to arrange the relative position of said mixing container and said guiding plates that the angle between the inner wall of the mixing container and the guiding plates can be changed.

In conformity with the present invention, the guiding plates are journalled in the turnstile in such a way that they are tiltable about an axis parallel to their longitudinal extension and can be arrested in any desired tilting position. In this connection, it is, of course, also possible to impart upon all of said guiding plates the same angle with regard to the inner wall of the mixing container or to arrest the guiding plates at different angles. Different adjusting angles or angles of attack cause a certain "disquietness" in the mixing material, however, this brings about an intensive intermixture.

In order to maintain the relative angle adjustment of the individual flow guiding plates with regard to each other when an adjustment is effected, and in order to avoid the cumbersome individual adjustment of the guiding plates, it is advantageous to interlink the guiding plates in spaced relationship from their pivotal axis. The same effect may also be obtained by interconnecting the flow guiding plates with gear segments which cooperate with a rotatable and arrestable gear arranged on the shaft for the turnstile.

When in conformity with a further feature of the invention, the flow guiding plates are tiltable about an axis which is approximately perpendicular to the circumferential surface of the mixing container and can be adjusted in any desired tilting position on the turnstile, there exists the possibility to tilt said plates simultaneously when changing the direction of rotation and to tilt said guiding plates into the new direction of rotation whereby a complete and safe cleaning off of adhering mixture residues will be effected. Moreover, the said guiding plates may when emptying the container be tilted into such a position that the emptying of the container will be aided and the mixed material will be moved toward the bottom of the mixing container.

A simple and reliable design according to the invention is obtained by mounting the guiding plates which advantageously consist of torsion-resistant material, between two turnstiles at the bottom and at the cover of the mixing container while the turnstiles are rotatable in opposite direction with regard to each other and can be arrested in any desired angular position with regard to each other. Furthermore, the axial distance of the turnstiles with regard to each other may be variable. By rotating the two turnstiles relative to each other, the flow guiding plates arranged therebetween are brought into a position which more or less deviates from the axis of the mixing container. When in addition thereto, the connecting line between the bearings for the flow guiding plates in both turnstiles are not parallel to the longitudinal direction of the flow guiding plates, the flow guiding plates are during a rotation of the two turnstiles relative to each other tilted more or less toward the axis of the mixing container and are arrested in any desired position.

The adherence of mixing material behind the flow guiding plates is, in conformity with a further feature of the present invention, safely prevented by providing said guiding plates with cuts which have to be passed through by the mixing material and which are open toward the inner wall of the mixing container and in the direction of the longitudinal extension of the said plates are offset with regard to each other. In this way, the mixing material can first at least partially pass by the flow guiding plates whereby an adherence or deposit of the material behind the flow guiding plates will be avoided. An accumulation of the mixing material on the inner wall of the mixing container will be prevented by arranging the cut over one of the succeeding guiding plates at a different location so that the mixing material which previously had passed by the flow guiding plates will be returned into the circulation.

The proper intermixing of the entire mixing material is greatly aided by the fact that the closure of the discharge is formed by a throttle at the discharge mouth. In this way non-intermixed mixing material is prevented from accumulating in the discharge connection. The entire mixing material remains within the range of turbulence of the agitator. In order to obtain a tight closure, it is advantageous to mount the throttle eccentrically while the major throttle surface is pressed against its seat by the pressure of the mixing material.

Referring now to the drawing in detail, and FIG. 1 thereof in particular, the arrangement shown therein comprises a mixing container 4 having the shape of a truncated cone resting on its smaller surface. An agitator extending from the top into the mixing container 4 is so arranged that the driving shaft 70 is approximately parallel to the wall of the mixing container 4. Drive shaft 70 is on one hand journalled in cover 42 of the mixing container 4 and passes through said cover near the upper marginal portion thereof. The other end of shaft 70 is journalled in a thrust bearing 72 which is located in the neighborhood of the agitating members proper. The agitating mechanism 71, which is arranged near the bottom 53 of the container, comprises propeller blades 73 which, in conformity with a further development of the present invention, are so shaped that at the lowest adjustable speed of said blades, cavitation does not yet occur while the cavitation limit is being approached. On driving shaft 70, above the agitating mechanism 71, or above the bearing 72 there is provided a worm 74 which conveys the mixing material in mixing container 4 in operative direction of rotation 75 toward the agitating mechanism 71.

Arranged on the inner wall of the mixing container 4 and extending from the top to the bottom are sheet metal guiding plates 76 which are so designed that they always guide the mixing material back to the center of the mixing container 4. Moreover, the said guiding plates 76 prevent the mixing material in mixing container 4 from assuming too fast a rotational speed. Bottom 53 of the mixing container 4 forms approximately a right angle with regard to driving shaft 70 of the agitator 72. The extension of said bottom leads to a discharge connection 5 which is normally closed by a throttle valve 79 which is pivotable at 77. Throttle valve 79 is so mounted that the major throttle valve surface 78 is, by means of the pressure of the mixing material in container 4, pressed against its seat. Due to the fact that throttle valve 79 is arranged directly at the mouth of the discharge connection 5, no intermixed mixing material can collect in the discharge connection. The entire mixing material will remain in the range of turbulence of the agitator mechanism 71.

Figure 2:
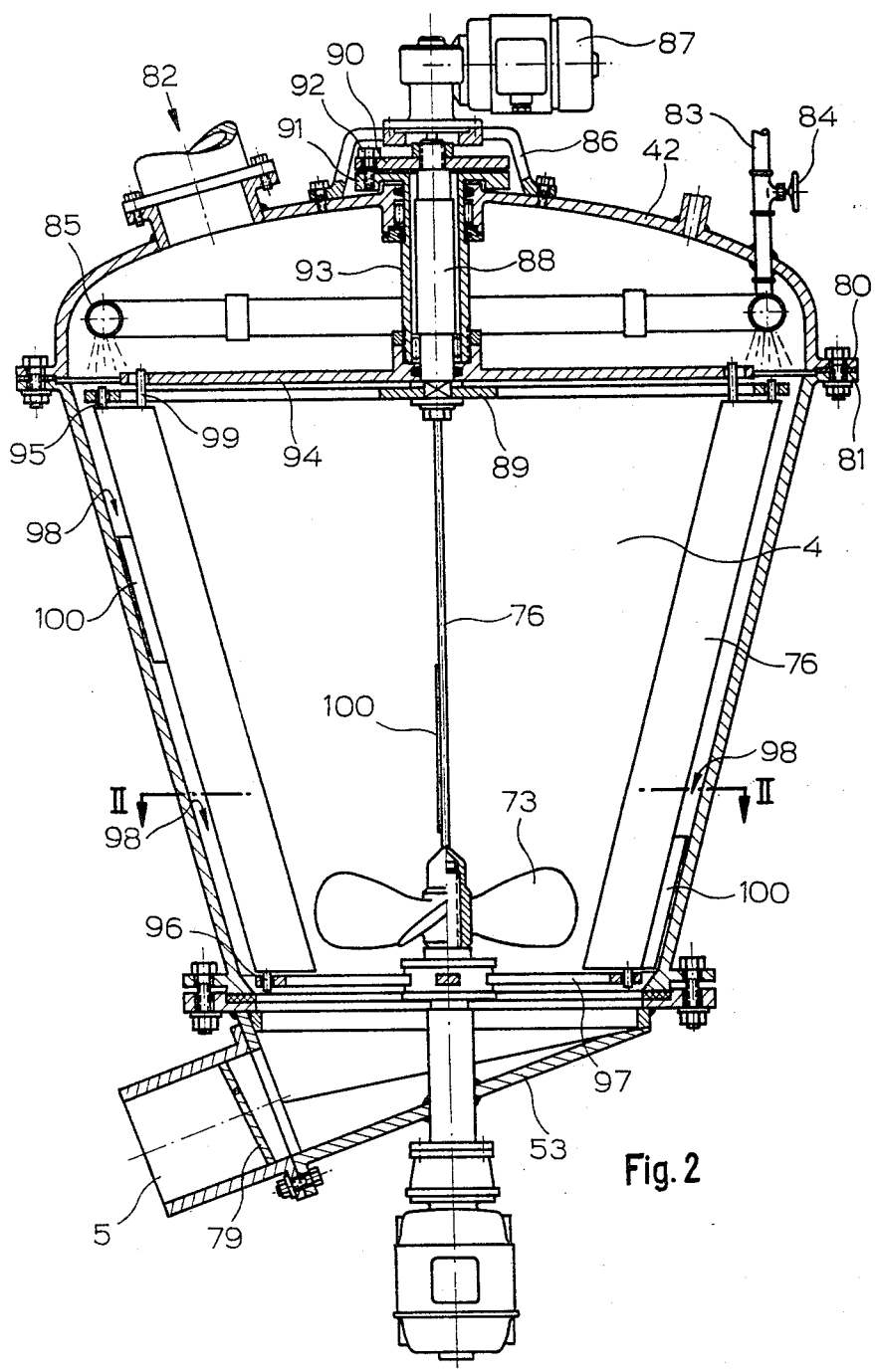
FIG. 2 is a modified mixing apparatus according to the invention with a drive from the bottom and rotatable sheet metal guiding plates.

Referring now to FIG. 2, the centrally arranged agitating mechanism with propeller blades 73 extends through the inclined bottom 53 of the container. Mixing container 4 is closed by a cover 42 which, by means of flanges 80, 81, can be screwed onto the container. Feeding lines 82 for the binding means and, if desired, also feeding lines for the fillers as well as a water line 83 with a valve 84 lead through the cover. The water line leads into a spray pipe 85 which directs the entering water jet against the inner wall of mixing container 4. Mounted on cover 42 by means of a hood 86 is an electric driving motor 87 which is adapted through a shaft 88 to drive a turnstile 89. Shaft 88 is fixedly connected to a flange 90 which is connected through screw bolts 92 with a further flange 91. Flange 91 is connected to hollow shaft 93 which in its turn is rigidly connected to an adjusting ring 94. By means of studs 93, 96 flow guiding plates 76 are tiltably arranged in the upper turnstile 89 and a lower turnstile 97 which is coaxially journalled. The flow guiding plates 76 have cutouts 98 which are open toward the inner wall of the mixing container and which are offset with regard to each other as to height. Further studs 99 are arranged on plates 76 in spaced relationship to stud 95, said studs 99 being attached to the adjusting ring 94. For purposes of effecting an operation, the mixing water is filled into the mixing container 4 through water feed line 83, valve 84, and spraying pipe 85. The agitator is brought up to such a speed that at the propeller blade 73 a cavitation will not yet occur although the cavitation line is being approached. There will then be formed a turbulence or whirl the funel-shaped tip ends approximately above the agitator. At the same time, the guiding plates 76 are by means of the electric drive motor 87 and shaft 88 as well as turnstile 89 caused to rotate. After adding the binding means and, if desired, the filler material, the speed of the agitator is increased to such an extent that an intensive intermixing will take place. In this connection, the guiding plates 76 continue to rotate according to the desired relative speed between mixing material and guiding plates in the direction of rotation of the agitator or in opposite direction thereof. The rotation of the guiding plates 76 prevents an adherence of the mixing material behind the guiding plates 76 when looking in the direction of flow of the material. This is aided by the fact that the mixing material can at least partially bypass the guiding plates 76 through the cutouts 98. An adhering of the mixing material to the inner wall of the mixing container 4 is prevented by the fact that those portions 100 of the guiding plates 76 which are adjacent the inner wall are offset as to height and thus return the mixing material into circulation. After the mixing operation has been completed, mixing container 4 is emptied through a discharge connection 5 provided with a throttle valve 79.

FIGURE 2a shows plates 76 to be turned in cross section with their inner edge portions radial to the container. FIGURE 2b shows the same blades but with their inner edges inclined against the direction of material flow.

During the next following cycle, the flow guiding plates 76 are advantageously during the introduction of the mixing water driven in opposite direction with regard to the direction in which they are driven during the succeeding mixing operation. In this way, all mixture residues which still adhere on the guiding plates will definitely be washed away by the incoming mixing water.

In order to assure a proper circulation also when the consistency of the mixing material varies, the guiding plates 76 are tilted prior to the start of the mixing operation, by means of the adjusting ring 94 and are brought into an angular position which represents the optimum position with regard to the direction of flow of the mixing material. To this end, screw bolts 92 are loosened and the adjustment of the angular position is effected by turning the two flanges 90, 91 with regard to each other. By tightening the screw bolts 92, this optimum angular position is arrested.

Figure 3:
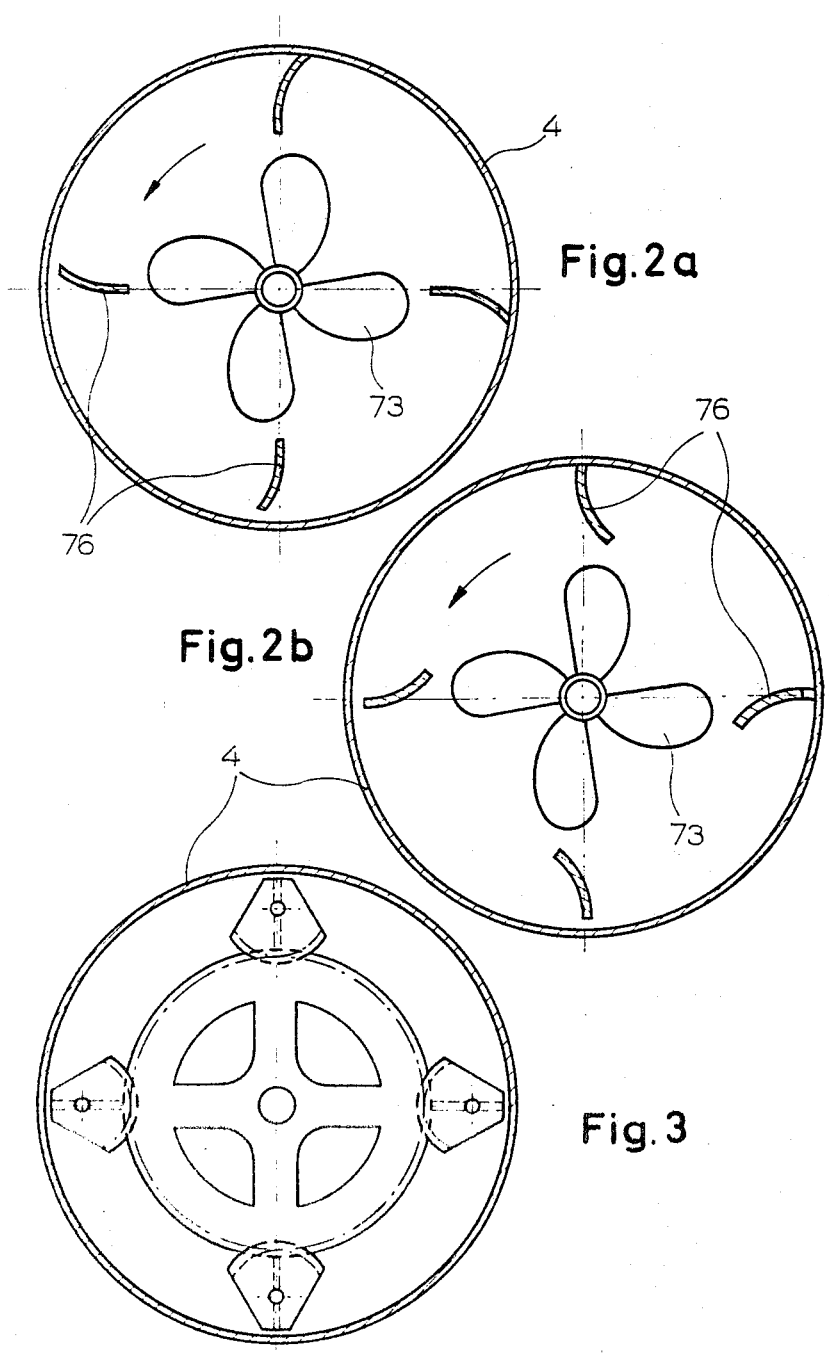
FIG. 3 shows the cooperation of flow guiding plates equipped with a toothed segment with an adjusting gear common thereto.
Figure 4:
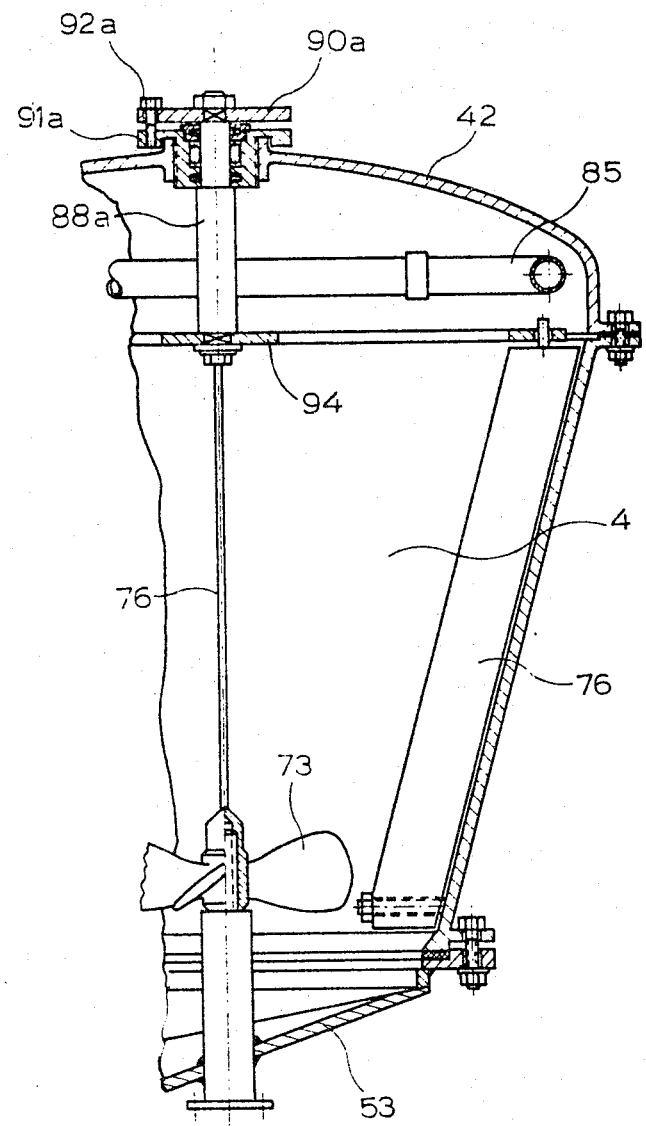
FIG. 4 shows how the flow guiding plates can be tilted about an axis vertical to the wall surface of the mixing container by means of an adjusting device and also shows how said guiding plates can be arrested in their respective tilted position.

FIGURE 3 shows how adjusting ring 94 could be in the form of a gear and cooperate with gear segments on the respective blades 76 for tilting the blades.

FIGURE 5 shows the blades 76 mounted at their lower end on radial pivot bolts with ring 94 connected to the upper ends of the blades for tilting the blades in the circumferential direction.

It is, of course, to be understood that the present invention is, by no means, limited to the particular arrangements shown in the drawings and the method set forth above, but also comprises any modifications within the scope of the appended claims.

What I claim is:

1. A mixing apparatus for mixing hydraulically hardenable binding material and water, especially for making a cement-water paste, which comprises: a container having inlet means arranged at the top portion thereof for respectively admitting hydraulically hardenable binding material and water into said container, said container also being provided with discharge means at the bottom portion thereof, rotatable agitating means arranged within said container and including propeller-shaped rotor blades, a plurality of flow guiding means arranged near and extending in the longitudinal direction of the circumferential inside wall of said container and being spaced from each other in circumferential direction of said circumferential inside wall, motor means arranged outside said container and drivingly connected to said agitating means for rotating said agitating means, said motor means being operable to drive said agitating means at a first speed which is below the speed at which cavitation occurs at said rotor blades and at a second speed which is above the speed at which cavitation occurs at said rotor blades, said agitating means including a rotatable shaft extending from the top of said mixing container into the interior thereof and having one end of said shaft drivingly connected to said propeller-shaped rotor blades and having its other end drivingly connected to said rotor means, and worm means arranged within said container and surrounding said shaft while being rotatably connected thereto.

2. An apparatus according to claim 1, which includes throttle valve means in said discharge means, said throttle valve means including an eccentrically journalled throttle flap.

3. A mixing apparatus for mixing hydraulically hardenable binding material and water, especially for making a cement-water paste, which comprises: a container having inlet means arranged at the top portion thereof for respectively admitting hydraulically hardenable binding material and water into said container, said container also being provided with discharge means at the bottom portion thereof, rotatable agitating means arranged within said container and including propeller-shaped rotor blades, a plurality of flow guiding means arranged near and extending in the longitudinal direction of the circumferential inside wall of said container and being spaced from each other in circumferential direction of said circumferential inside wall, motor means arranged outside said container and drivingly connected to said agitating means for rotating said agitating means, said motor means being operable to drive said agitating means at a first speed which is below the speed at which cavitation occurs at said rotor blades and at a second speed which is above the speed at which cavitation occurs at said rotor blades, and rotatable supporting means supporting said flow guiding means, said rotatable supporting means being supported in the container for rotation about the axis of said container.

4. An apparatus according to claim 3, in which each of said flow guiding means is tiltable about an axis extending in the longitudinal direction thereof and is arrestable in its respective adjusted position.

5. An apparatus according to claim 4, which includes link means interconnecting said flow guiding means and operable to tilt the same about the said axis thereof.

6. An apparatus according to claim 4, in which said flow guiding means and said rotatable supporting means therefor are provided with intermeshing gear means operable selectively to tilt each of said flow guiding means about said axis thereof.

7. An apparatus according to claim 1, in which each of said flow guiding means is tiltable about an axis at least approximately perpendicular to the respective adjacent portion of the circumferential inside wall of said container, and means for arresting said flow guiding means in the respective tilted position thereof.

8. An apparatus according to claim 1, which includes two rotatable supporting members respectively arranged at opposite ends of said flow guiding means and supporting the same, said two rotatable supporting members being rotatable relative to each other, means for varying the axial distance between said two rotatable supporting members, and means for arresting said flow guiding means in their respective adjusted positions.

9. An apparatus according to claim 1, which includes bearing means journalling said flow guiding means so that a straight line of connection between the bearing means for each of said flow guiding means is at an angle with regard to the longitudinal extension of the respective flow guiding means.

10. An apparatus according to claim 3, in which said flow guiding means are respectively provided with cutouts in the radially outer edges offset with regard to each other in the direction of the longitudinal extension of said flow guiding means, said cutouts being open toward the respective adjacent portion of said circumferential inside wall and forming passage means for the flow of the content of said mixing apparatus.

11. A method of making a cement-water paste in a mixing container having rotatable mixing blades therein, which includes the steps of: introducing mixing water into said container, rotating said blades at a first speed so as to subject said introduced mixing water to rotation while avoiding cavitation, introducing cement into said rotating water, and increasing the rotational speed of said blades to a second speed at which cavitation is produced.

12. A method according to claim 11, in which the said first speed of said blades is just below cavitational speed.

References Cited

UNITED STATES PATENTS

| | | | |
|---|---|---|---|
| 1,991,833 | 2/1935 | Adams | 259—179 |
| 2,608,393 | 8/1952 | Hale | 259—151 |
| 2,956,790 | 10/1960 | Moriya | 259—151 |
| 2,857,533 | 10/1958 | Miller | 310—50 |

ROBERT W. JENKINS, *Primary Examiner.*